United States Patent
Eisenhammer et al.

(10) Patent No.: US 7,311,795 B2
(45) Date of Patent: Dec. 25, 2007

(54) METHOD FOR THE BONDING OF DISK-SHAPED SUBSTRATES AND APPARATUS FOR CARRYING OUT THE METHOD

(75) Inventors: Thomas Eisenhammer, Azmoos (CH); Jeff Ou-Yang, Beveryly Hills, CA (US)

(73) Assignee: OC Oerlikon Balzers AG, Balzers (LI)

( * ) Notice: Subject to any disclaimer, the term of this patent is extended or adjusted under 35 U.S.C. 154(b) by 410 days.

(21) Appl. No.: 10/803,400

(22) Filed: Mar. 18, 2004

(65) Prior Publication Data

US 2005/0039841 A1   Feb. 24, 2005

Related U.S. Application Data

(60) Provisional application No. 60/497,224, filed on Aug. 22, 2003.

(51) Int. Cl.
*B32B 37/10* (2006.01)
(52) U.S. Cl. .................. 156/286; 156/285; 156/295; 156/382
(58) Field of Classification Search .............. None
See application file for complete search history.

(56) References Cited

U.S. PATENT DOCUMENTS

| | | |
|---|---|---|
| 4,990,208 A | 2/1991 | Kano |
| 5,582,677 A | 12/1996 | Miwa et al. |
| 5,766,407 A | 6/1998 | Miwa et al. |
| 5,843,257 A | 12/1998 | Inouchi |
| 6,136,133 A | 10/2000 | Maruyama et al. |

(Continued)

FOREIGN PATENT DOCUMENTS

DE   196 51 423 A1   12/1996

(Continued)

OTHER PUBLICATIONS

On-line translation of JP 2003-006940 to Noriaki.*

(Continued)

*Primary Examiner*—Jessica Ward
(74) *Attorney, Agent, or Firm*—Pearne & Gordon LLP

(57) ABSTRACT

A first substrate (11a) is positioned on a support surface (7) in a vacuum chamber with an upward-facing first bonding surface (12a) spin-coated with adhesive while a second substrate (11b) is held with downward-facing second bonding surface (12b) to a cover (3) by suction. While the vacuum chamber is being evacuated to a pressure of between 0.1 mbar and 2 mbar, a support pin (9) is extended through central openings (14a, 14b) of the substrates (11a, 11b) and then retracted with the second substrate (11b) released from the cover (3) and carried by radially extended balls (10). The support pin (9) is lowered to a position where the balls (10), acting against the first bonding surface (12a), deform the first substrate (11a). The first bonding surface (12a) being therefore slightly concave, the first and second bonding surfaces (12a, 12b) only touch close to their circumferences. Retraction of the balls (10) causes a spreading of the contact area radially inwards to cover the first and second bonding surfaces (12a, 12b) without entrapment of non-bonded areas. The substrates (11a, 11b) are then lifted by the support pin (9) with again extended balls (10) and pressed against the cover (3) and the vacuum chamber is aired.

14 Claims, 3 Drawing Sheets

U.S. PATENT DOCUMENTS

| | | | |
|---|---|---|---|
| 6,183,577 B1 | 2/2001 | Kozono et al. | |
| 6,254,716 B1 * | 7/2001 | Russell et al. | 156/286 |
| 6,265,578 B1 | 7/2001 | Foley et al. | |
| 6,291,046 B1 | 9/2001 | Ohno et al. | |
| 6,312,549 B1 | 11/2001 | Miyano et al. | |
| 2003/0070765 A1 * | 4/2003 | Eichlseder | 156/580 |

FOREIGN PATENT DOCUMENTS

| | | |
|---|---|---|
| DE | 197 15 779 A1 | 4/1997 |
| DE | 100 08 111 A1 | 2/2000 |
| EP | 0 624 870 A2 | 11/1994 |
| EP | 0 624 870 B2 | 11/1996 |
| EP | 0 866 450 A1 | 9/1998 |
| EP | 1 288 933 A2 | 5/2003 |
| JP | 1-204727 * | 8/1989 |
| JP | 2006-323957 * | 11/2006 |

OTHER PUBLICATIONS

Minoda Katsufumi, Device and Method for Disk and Method for Disk Manufacturing, Shibaura Mechatronics Corp., Patent Abstracts of Japan, Publication No. 2000-315338.

Doi Noriaki, Method and Device for Manufacturing Disk, Sony Corp., Patent Abstracts of Japan, Publication No. 2003-006940.

* cited by examiner

METHOD FOR THE BONDING OF DISK-SHAPED SUBSTRATES AND APPARATUS FOR CARRYING OUT THE METHOD

FIELD OF THE INVENTION

The invention relates to a method for the bonding of disk-shaped substrates and an apparatus for carrying out the method. Method and apparatus are used in particular for the production of optical disks for data storage such as DVD disks.

PRIOR ART

DVD and similar disks usually comprise a lower disk-shaped substrate and an upper disk-shaped substrate, both with central circular openings, which normally consist of a plastic material like polycarbonate. At least the lower substrate carries a thin optically active, i.e. reflective or semi-reflective layer, usually consisting of a metal like Al, Au, Ag, Cu or an alloy, which carries the data. The upper substrate is bonded to the lower substrate by an adhesive, e.g., a UV-curable resin or a hot melt. The liquid adhesive is usually applied to the lower substrate before the substrates are joined and cured after the joining step. Alternatively, use of adhesives in the shape of flexible sheets has been proposed.

Many different processes have been described for bonding the substrates. In most cases the adhesive is applied to the upper side of the lower substrate whereupon the parallel upper substrate is lowered or dropped onto the adhesive layer and then pressed against the same as disclosed, e.g., in U.S. Pat. Nos. 6,265,578 A and 6,291,046 B. Major problems of this general method are variations in the thickness of the adhesive layer which is spread merely by mechanical pressure exerted by the often slightly warped substrates and the entrapment of gas which then forms inclusions or bubbles whenever areas where the adhesive and the upper substrate have not bonded properly are surrounded by bonded areas. Both effects influence the optical properties of the disk and may cause misreading of stored data.

To avoid the latter of the said problems the bonding step is often carried out in a vacuum or partial vacuum. Although the problem of creating bubbles by entrapment is thereby reduced it could only be virtually completely solved in this way by applying high-vacuum which, however, would require long cycle times and expensive high performance vacuum pumps and is therefore unacceptable for economic reasons. Also, longer exposure to vacuum may cause the formation of bubbles from gases solved in the adhesive under atmospheric pressure as it begins to outgas and it is usually not possible to wait for complete outgassing as this would increase cycle times even further beyond the economically acceptable.

An example of the above-mentioned process is described in U.S. Pat. No. 4,990,208 A where UV-curable adhesive is applied to the top side of the lower substrate via a nozzle of a dispenser in such a way that it covers, e.g., an annulus-shaped zone. After transferral of the lower substrate and the upper substrate to a vacuum chamber and reduction of the pressure to below 30 torr (40 mbar), the upper substrate is lowered onto the adhesive layer. The whole process may be carried out in a vacuum chamber. However, this requires a relatively large chamber which exacerbates the problems mentioned above. A process of this type is also described in JP 2000 315 338 A.

According to U.S. Pat. No. 5,582,677 A and U.S. Pat. No. 5,766,407 A a large vacuum chamber is avoided in that a small cylindrical vacuum chamber which narrowly encloses the substrates is provided. After the joining of the upper and lower substrates the atmospheric pressure is used for pressing the substrates against each other.

In several prior art publications it has been proposed to use spin coating where the adhesive is spread over the upper surface of the lower substrate by rotation of the same in order to achieve a layer of constant thickness. According to U.S. Pat. No. 6,136,133 A the bonding step is then carried out in a vacuum chamber at a pressure of about 50 pa (0, 5 mbar). In DE 197 15 779 A1 a similar process is described. While spin coating provides adhesive layers of essentially constant thickness it does not solve the problem of gas inclusions.

According to a somewhat different method, the disk is spun after the substrates have been joined as described in U.S. Pat. No. 5,843,257 A. Here the centrifugal forces lead to a radially increasing thickness of the adhesive layer unless they are exactly balanced by suction from the edge of the central opening. Such balancing, however, requires precise control of angular velocity and pressure and is therefore difficult to achieve. According to U.S. Pat. No. 6,183,577 B1 the problem is alleviated in that the lower substrate is elastically deformed so as to form a central depression which should accommodate surplus adhesive. However, the control requirements are still difficult to fulfill.

EP 0 624 870 B1 shows a bonding method where, after a two package epoxy resin adhesive has been applied to the upper surface of the lower substrate along a circle surrounding the central opening, the upper substrate and the lower substrate are held in positions where they enclose an acute angle and first touch at contact points at the outer edges when the upper substrate is lowered. With the edge of the upper substrate opposite the point of first contact being lowered further by, e.g., 1 mm/s, the upper substrate pivots about the contact point until the substrates are parallel and joined, with the adhesive spread between them. This method, however, may as well lead to a varying thickness of the adhesive layer. Also, entrapment of gas bubbles cannot be excluded.

A similar method is apparent from DE 196 51 423 A1 where the upper substrate is supported by a holding arm pivotable about an axis at the level of the upper surface of the lower substrate in such a way that the upper substrate is at the same time lowered onto the lower substrate and rotated into an orientation parallel to the same. Even where the process is carried out in a vacuum, entrapment of gas can not be completely excluded unless high-vacuum is employed. This, however, would again require espensive high performance vacuum pumps and long cycle times. After joining of the substrates the disk may be spun in order that the adhesive be more equally distributed while suction is applied at the boundary of the central opening to balance the centrifugal forces. This step is fraught with problems as explained above.

According to JP 2003 006 940 A the lower and the upper substrate are accommodated in a vacuum chamber where the outer edge of the upper substrate is supported by spring-biased bolts a short distance above the lower substrate. Its center portion is then pressed downward by a pressing pad and joined to the center portion of the lower substrate while the upper substrate is slightly elastically deformed. After evacuation of the chamber the pressure of the pad is increased and thereby the contact area spread radially outward. With this method the risk of gas entrapments is indeed very low, however, the pressure applied to the upper substrate decreases from the center outward which may cause a radially varying thickness of the adhesive layer.

In U.S. Pat. No. 6,312,549 B1 another bonding method is described where the upper substrate is held in a deformed state, whith its lower surface slightly convex, by a suction holding device. When it is lowered onto the adhesive layer contact is first established at the edges of the central openings whereupon the upper substrate is released and, assuming its unstressed plane configuration, contacts the whole of the adhesive-covered upper surface of the lower substrate.

An alternative method is then proposed where the upper substrate is again slightly deformed, with the center portion held about 1.5 mm above the outer edge by a suction holding device and its lower surface slightly concave. After contact has been established between the outer edges of the substrates, the space between them is evacuated through a central opening of the lower substrate until the center portion of the upper substrate is detached from the holding device by the suction of the vacuum and the lower surface of the released upper substrate contacts the whole of the upper surface of the lower substrate. The adhesive which initially covers an annulus-shaped zone on the upper surface of the lower substrate is thereby spread out between the surfaces.

Due to the fact that the release of the upper substrate is a function of several parameters which cannot be precisely controlled and reproduced like atmospheric pressure, contact surface and pressure in the suction holding device, elastic forces produced by the deformation of the upper substrate as well as the decreasing pressure between the substrates the step is not precisely controllable, in particular with respect to its timing. This makes reliable execution of the bonding step with defined and short cycle times difficult to achieve. It is, moreover, difficult to keep the space between the substrates reliably sealed and its evacuation through one of the central openings requires a complex apparatus.

DE 100 08 111 A1 shows a somewhat similar bonding method where the upper and lower substrates are placed in a small vacuum chamber and attached to its top and bottom, respectively, by suction holding devices. The upper surface of the lower substrate is covered with hot melt. As soon as the chamber is sufficiently evacuated, the substrates are forced towards each other by a feeding of compressed air to both suction devices. Contact between them is first established at the center portions and spreads from there to the outer edges as both substrates are initially deformed by the impact of the compressed air. With this method the motions of the substrates and, as a consequence, their relative positions cannot be precisely controlled which may lead to defects of the finished product.

SUMMARY OF THE INVENTION

It is the object of the invention to provide a method where the joining of the substrates takes place in a controlled manner, where variations of the thickness of the adhesive layer is small and gas inclusions between the substrates are virtually absent.

The method according to the invention allows a precisely controlled bonding step with short cycle time and high and constant quality of the output.

It is a further object of the invention to provide an apparatus which is suitable for carrying out the method according to the invention. The apparatus according to the invention is simple, unexpensive and reliable.

BRIEF DESCRIPTION OF THE DRAWINGS

In the following the invention is described in more detail with reference to drawings referring to an embodiment of the invention where.

DESCRIPTION OF THE PREFERRED EMBODIMENTS

Figure 1A:
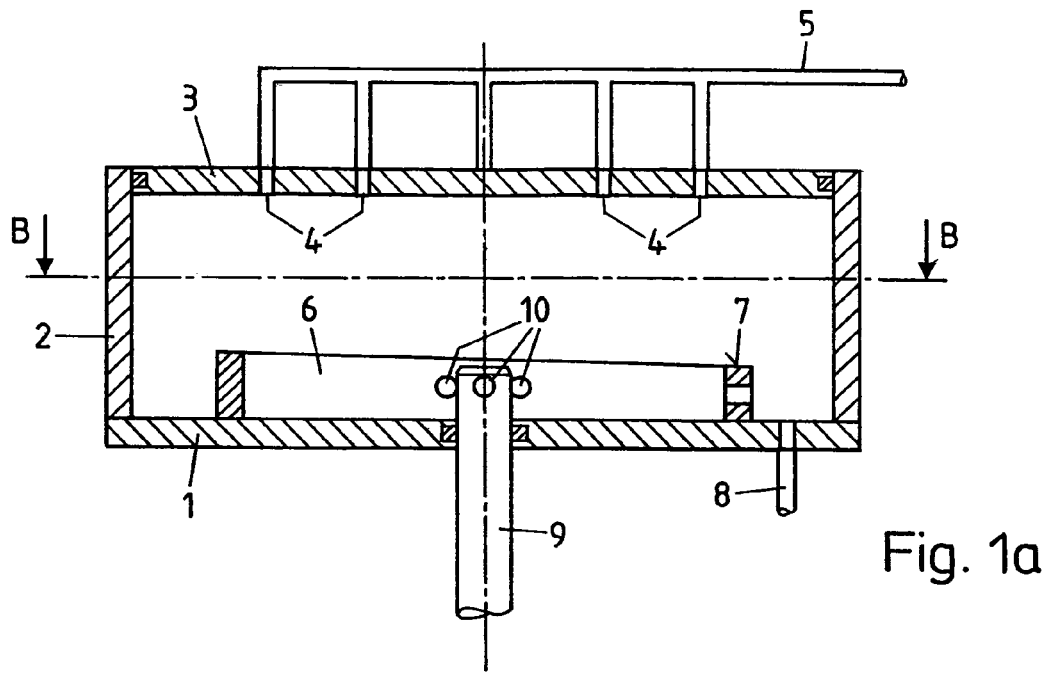
FIG. 1a is an axial section of an apparatus for carrying out the method according to the invention.
Figure 1B:
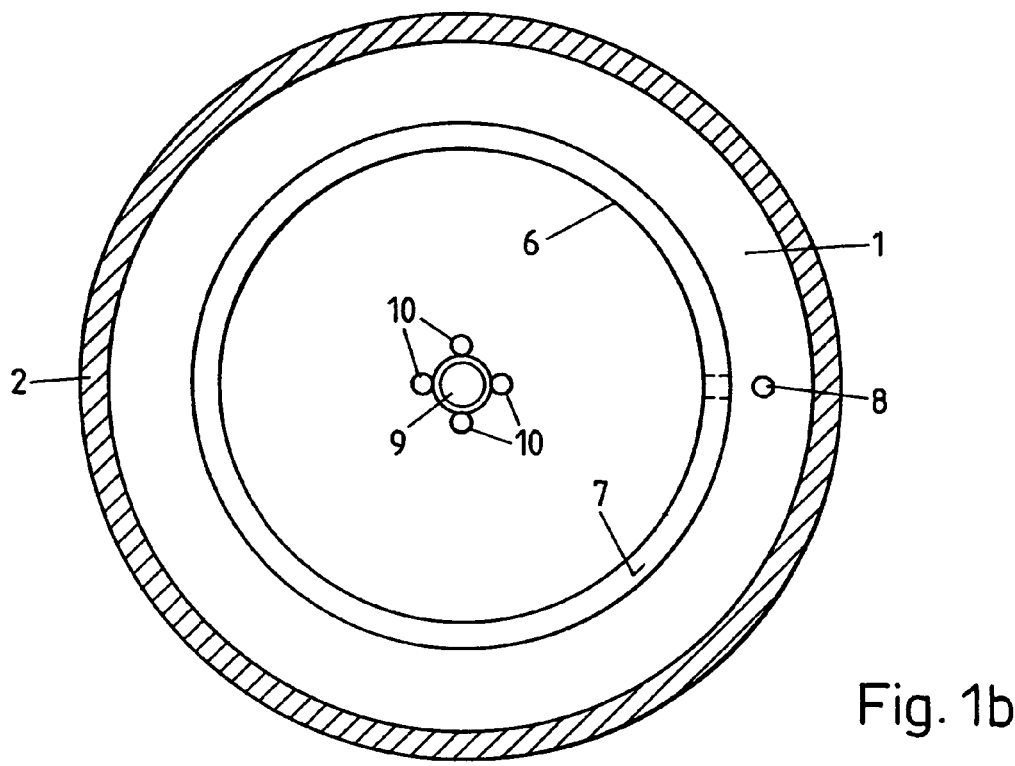
FIG. 1b is a horizontal section along B-B in FIG. 1a of the apparatus and FIG. 2a-f schematically show axial sections through the apparatus and substrates during various stages of the method according to the invention.

The apparatus comprises a cylindrical vacuum chamber with a base plate 1, a circumferential side wall 2 and a removable cover 3. Holes 4 which are connected via a suction line 5 to a suction pump (not shown) are distributed over the inside surface of the latter so the cover 3 can serve as a suction holding device. The base plate 1 carries a support 6, a web concentric with the side wall 2 whose annulus-shaped plane upward-facing support surface 7 is slightly slanted (to the right in FIG. 1a), defining a plane which encloses an angle of between 1° and 3°, preferably about 2° with the inside of the cover 3. From the bottom of the vacuum chamber, i.e. through the base plate 1 an evacuation line 8 leads to a vacuum pump (not shown). A central support pin 9 is extendable through the base plate 1. Its position can vary between a lower limit position where its tip lies below the support surface 7 and an upper limit position where the tip touches or nearly touches the cover 3. At a position just below the tip support pin 9 carries several (e.g., four) balls 10 accommodated in borings distributed over its circumference. The balls 10 can be radially extended and retracted behind the surface of the support pin 9. Support pins of this type, complete with actuators, are used in portable CD players and are therefore well known.

Figure 2A:
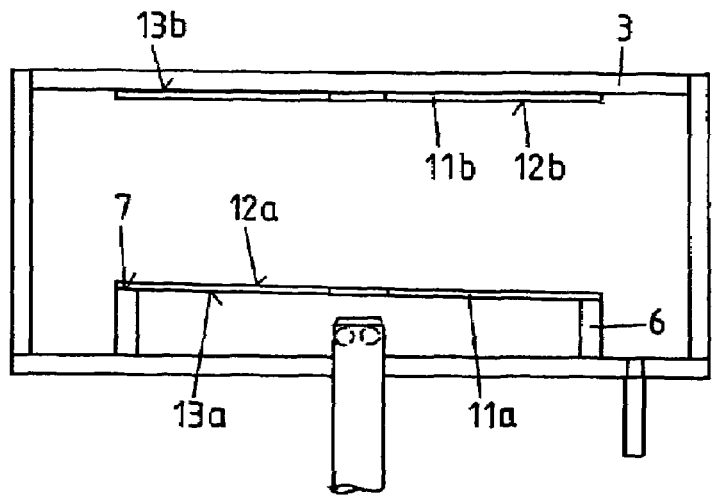

The process according to the invention may, as illustrated in FIGS. 2a-f, be carried out as follows:

In a first step of the method according to the invention a first disk-shaped substrate 11a made, e.g., from a transparent polycarbonate and containing a data-carrying metal layer, is provided whose upward-facing bonding surface 12a has previously been spin-coated with an, e.g., UV-curable, adhesive. The first substrate 11a is then deposed on the support 6 in the open vacuum chamber as a lower substrate, with an annulus-shaped part of its back surface 13a which is adjacent to its outer edge resting against the support surface 7. A second substrate 11b which may have the same general structure as the first substrate 11a is disposed as an upper substrate on the cover 3 where it is held by suction, i.e. with a back surface 13b against the inside of the cover 3, in a position above the first substrate 11a and essentially parallel to the same, apart from the small slant angle. Its downward-facing surface forms a second bonding surface 12b. Then the vacuum chamber is closed (FIG. 2a).

Figure 2B:
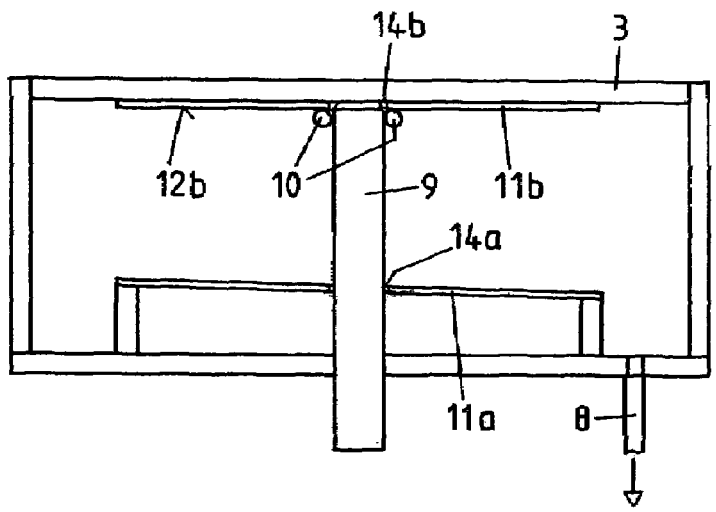
Figure 2C:
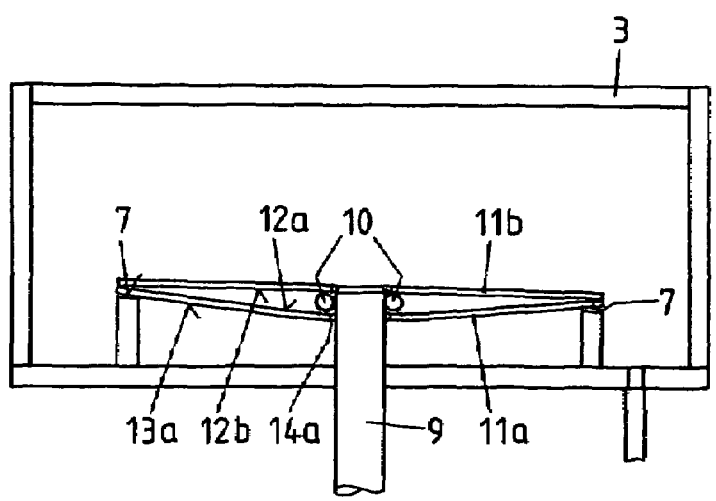

In a second step, support pin 9 is extended through central openings 14a, 14b of the substrates 11a, 11b and assumes an upper limit position where its tip is close to the cover 3. Then balls 10 are extended radially outward and the suction holding device which is integrated in cover 3 deactivated. The second substrate 11b is then supported by the balls 10, with a part of the second bonding surface 12b immediately adjacent the central opening 14b resting against the same. At the same time, evacuation of the vacuum chamber through evacuation line 8 begins (FIG. 2b).

During the evacuation process which takes approximately 2'700 ms the support pin 9 is being retracted. After about 2'650 ms the balls 10 touch the first substrate 11a, acting as a mechanical stop means against parts of the first bonding surface 12a immediately adjacent to the central opening 14a. The support pin 9 is retracted by approximately another 2 mm whereby a force directed away from the second substate 11b is exerted on the first substrate 11a at its center. It is thereby slightly elastically deformed, with the first bonding surface 12a assuming a concave shape where its center is about 2 mm below its circumference as the latter is kept in essentially its previous position by the support surface 7 acting as a mechanical stop means against the back surface 13a close to its circumference (FIG. 2c) and exerting a force directed towards the second substrate 11b on the first substrate 11a. The second bonding surface 12b touches the first bonding surface 12a at a small contact area on the left in FIG. 2c at the circumferences of the first bonding surface 12a and the second bonding surface 12b. At the same time, the pressure in the vacuum chamber has reached a set value of, e.g., 1 mbar.

Figure 2D:
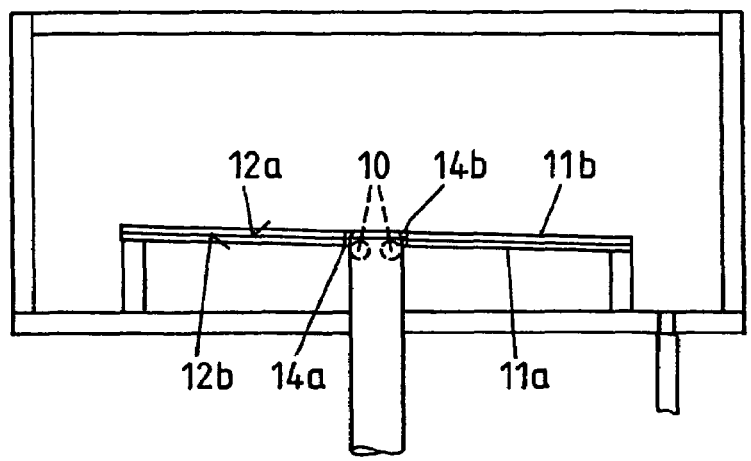

Now, 2'700 ms after the beginning of the evacuation process, the balls 10 are retracted. The released first substrate 11a snaps back to its unstressed plane configuration. As a consequence, the contact area quickly extends to a narrow annulus adjacent to the outer edge of the first bonding surface 12a and the second bonding surface 12b and then spreads radially inwards to the edges of central openings 14a, b. In this way, the contact area where the substrates are bonded spreads from a small contact area to the complete first bonding surface 12a and second bonding surface 12b without ever enclosing a not-yet-bonded part of the bonding surfaces (FIG. 2d). The boundary of the contact area forms a joining front which shifts continuously to the boundaries of the bonding surfaces. Entrapment of gas between the latter is therefore reliably avoided.

Figure 2E:
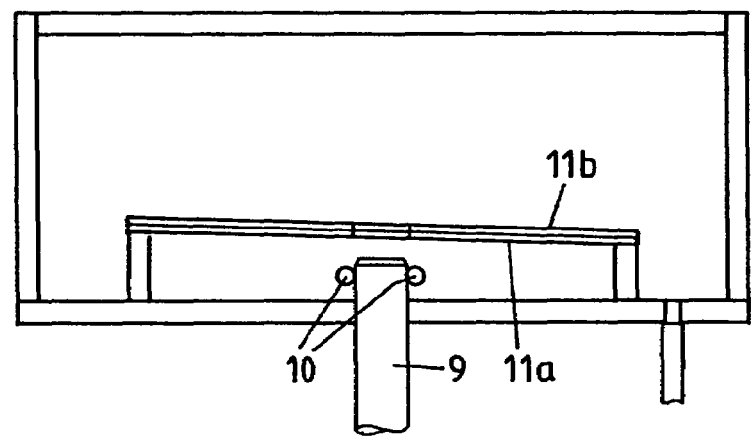
Figure 2F:
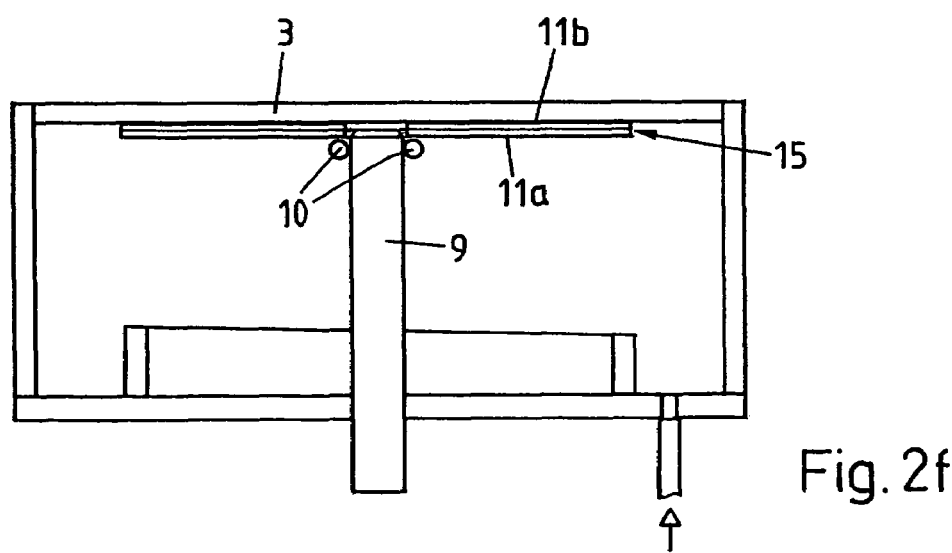

After retraction of the support pin 9 by a short distance the balls 10 are again radially extended (FIG. 2e). The support pin 9 is then extended, the balls 10 lifting the joined substrates 11a, 11b from the support 6 and up to the cover 3 which takes about 180 ms and then pressing them against the same (FIG. 2f), thereby completing the bonding between the first substrate 11a and the second substrate 11b to form a disk 15. After another 120 ms the vacuum is broken and the pressure quickly rises to atmospheric pressure and supports the compressing of the disk. The suction device is activated and holds the disk 15 to the cover 3. Then the vacuum chamber is opened and the disk 15 removed.

Due to the small volume of the vacuum chamber which narrowly encloses the substrates and with the sequence of steps as described above where the evacuation of the chamber is carried out in parallel with the mechanical manipulations of the substrates leading up to their joining, the bonding process takes only a few seconds altogether which is not only advantageous from an economic point of view but also virtually precludes outgassing of the adhesive under vacuum conditions.

It is obvious for those skilled in the art that the method and apparatus described above can be modified in many ways without departing from the spirit of the invention. For instance, the substrates may consist of any suitable material and the first substrate may contain two data-carrying layers. The adhesive can be of the hot melt or two package type. It can be spread on the second bonding surface instead of on the first or applied to both. The central mechanical stop means can have different, e.g., wedge-like shapes and the circumferential mechanical stop-means can be interrupted by gaps. Moreover, instead of central and circumferential mechanical stop means mechanical friction means which act on the edge of the central opening or the circumferential edge, respectively, can be employed.

The support surface need not be slanted. The contact area will in this case be a narrow annulus adjacent to the circumferences of the bonding surfaces unless there is a slight warp in one of the substrates or in both in which case the contact area may be restricted to a subset of the said annulus.

More far-reaching deviations from the embodiment described above are also possible. E.g., the first substrate may be bended in different ways by appropriately modified mechanical means, for instance in such a way that the first bonding surface assumes a convex shape in which case the contact area will be an annulus adjacent the central openings or some subset thereof. Also, the schedule of the process as well as other parameters thereof may differ.

LIST OF REFERENCE SYMBOLS

| | |
|---|---|
| 1 | base plate |
| 2 | side wall |
| 3 | cover |
| 4 | holes |
| 5 | suction line |
| 6 | support |
| 7 | support surface |
| 8 | evacuation line |
| 9 | support pin |
| 10 | balls |
| 11a, b | first and second substrates |
| 12a, b | first and second bonding surfaces |
| 13a, b | back surfaces |
| 14a, b | central openings |
| 15 | disk |

The invention claimed is:

1. A method for the bonding of disk-shaped substrates, the substrates comprising an essentially plane disk-shaped first substrate with a central opening and with a first bonding surface and a back surface opposite the first bonding surface, and an essentially plane disk-shaped second substrate with a central opening and with a second bonding surface to be bonded to the first bonding surface by a layer of adhesive, the method comprising the following steps:

providing the first substrate and the second substrate, applying liquid adhesive to the first bonding surface or the second bonding surface or both, subsequently positioning, in a vacuum chamber, the first substrate and the second substrate with the second bonding surface facing the first bonding surface at a distance, subsequently elastically deforming the first substrate in such a way that the first bonding surface assumes a bent shape, evacuating the vacuum chamber, moving the first substrate and the second substrate towards each other and establishing contact between them at an area of contact adjacent edges of the first bonding surface and the second bonding surface, and upholding said deformation of said first substrate by mechanical means acting thereon while said contact is being established, subsequently releasing the first substrate so as to allow it to assume its essentially plane configuration in such a way that the area of contact spreads essentially to the entire first and second bonding surfaces, and raising the pressure in the vacuum chamber to atmospheric pressure.

2. The method according to claim 1, characterized in that the liquid adhesive is spread over the first bonding surface, the second bonding surface, or both by spinning the first substrate, the second substrate, or both, respectively.

3. The method according to claim 1, wherein said area of contact is initially established adjacent outer edges of said first and second bonding surfaces.

4. The method according to claim 1, characterized in that the vacuum chamber is evacuated to a pressure of between 0.01 mbar and 100 mbar.

5. The method according to claim 4, said vacuum chamber being evacuated to a pressure of between 0.05 mbar and 10 mbar.

6. The method according to claim 4, said vacuum chamber being evacuated to a pressure of between 0.1 mbar and 2 mbar.

7. The method according to claim 1, characterized in that the first substrate is deformed in such a way that the first bonding surface assumes a concave or convex shape which is upheld by central mechanical means acting on the first substrate in the vicinity of the central opening of the same and circumferential mechanical means acting on the first substrate at positions offset towards the outer edge of the said first substrate.

8. The method of claim 7, wherein the first substrate is deformed in such a way that the first contact surface assumes a concave shape.

9. The method according to claim 7, characterized in that the central mechanical means exert on the first substrate a force directed away from the second substrate while the circumferential mechanical means exert on the first substrate a force directed towards the second substrate, upholding a deformation of the first substrate where the shape of the first contact surface is concave.

10. The method according to claim 9, characterized in that the central mechanical means comprise mechanical stop means acting against the first bonding surface and the circumferential mechanical means comprise mechanical stop means acting on the back surface of the first substrate.

11. The method according to claim 9, characterized in that, due to the elastic deformation of the first substrate, the area of the first bonding surface adjacent the central opening is offset from a plane intersecting the circumference of the first bonding surface by between 1 mm and 3 mm.

12. The method according to claim 9, characterized in that the initial area of contact is a narrow annulus, or a portion thereof, adjacent the outer edges of the first bonding surface and the second bonding surface.

13. A method for the bonding of disk-shaped substrates, the substrates comprising an essentially plane disk-shaped first substrate with a central opening and with a first bonding surface and a back surface opposite the first bonding surface, and an essentially plane disk-shaped second substrate with a central opening and with a second bonding surface to be bonded to the first bonding surface by a layer of adhesive, the method comprising the following steps:

providing the first substrate and the second substrate, applying liquid adhesive to the first bonding surface or the second bonding surface or both, positioning, in a vacuum chamber, the first substrate and the second substrate with the second bonding surface facing the first bonding surface at a distance, elastically deforming the first substrate in such a way that the first bonding surface assumes a concave shape and upholding the deformation by mechanical means acting on the first substrate, evacuating the vacuum chamber, holding the first substrate in a tilted position with respect to the second substrate while moving the first substrate and the second substrate towards each other to establish an area of contact between them, thereby assuring that the area of contact is at first restricted to a predefined sector of an annulus adjacent the outer edges of the first bonding surface and the second bonding surface;

releasing the first substrate so as to allow it to assume its essentially plane configuration in such a way that the area of contact spreads essentially to the entire first and second bonding surfaces, and raising the pressure in the vacuum chamber to atmospheric pressure.

14. The method of claim 13, characterized in that the angle between the plane of the first substrate and the plane of the second substrate is at least 1° and not greater than 3°.

* * * * *